US010275368B2

(12) United States Patent
Ito et al.

(10) Patent No.: US 10,275,368 B2
(45) Date of Patent: Apr. 30, 2019

(54) TERMINAL DEVICE, EXTERNAL PERIPHERAL DEVICE AND EXTERNAL PERIPHERAL DEVICE CONTROL METHOD

(71) Applicant: FUJITSU LIMITED, Kawasaki-shi, Kanagawa (JP)

(72) Inventors: Hidenobu Ito, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/624,016

(22) Filed: Feb. 17, 2015

(65) Prior Publication Data

US 2015/0248360 A1 Sep. 3, 2015

(30) Foreign Application Priority Data

Feb. 28, 2014 (JP) .................................. 2014-038776

(51) Int. Cl.
| *G06F 13/10* | (2006.01) |
| *G06F 3/12* | (2006.01) |
| *G06F 9/4401* | (2018.01) |
| *G06F 9/445* | (2018.01) |
| *G06F 9/54* | (2006.01) |

(52) U.S. Cl.
CPC .......... *G06F 13/102* (2013.01); *G06F 3/1209* (2013.01); *G06F 3/1236* (2013.01); *G06F 3/1292* (2013.01); *G06F 9/445* (2013.01); *G06F 9/4411* (2013.01); *G06F 9/54* (2013.01)

(58) Field of Classification Search
CPC .... G06F 13/102; G06F 3/1292; G06F 9/4411; G06F 9/445; G06F 9/54; G05F 3/1236

USPC ............. 710/5, 8, 313, 22, 62, 110, 11, 105; 719/321, 324; 709/203; 345/520
See application file for complete search history.

(56) References Cited

U.S. PATENT DOCUMENTS 6,952,931 B2 * 10/2005 Beatenbough .......... F25B 45/00
62/149
2002/0051172 A1 5/2002 Nomura
(Continued)

FOREIGN PATENT DOCUMENTS

| DE | 19708755 A1 | 9/1998 |
| EP | 1 591 891 | 11/2005 |

(Continued)

OTHER PUBLICATIONS

EESR—Extended European Search Report of European Patent Application No. 15154676.9, dated Jun. 8, 2015.
(Continued)

*Primary Examiner* — Farley Abad
*Assistant Examiner* — Henry W Yu
(74) *Attorney, Agent, or Firm* — Fujitsu Patent Center

(57) ABSTRACT

A terminal device includes an operating system that does not allow a user to have right to incorporate a device driver in the operating system, a processor, and a memory that is capable of storing therein the operating system in which a first device driver is preliminarily incorporated and an application, wherein the application includes a second device driver that converts a first control command provided by the application into a second control command in a form deliverable to an external peripheral device, and the first device driver transmits the second control command output from the second device driver to the external peripheral device.

2 Claims, 17 Drawing Sheets

(56) References Cited

U.S. PATENT DOCUMENTS

| | | | | |
|---|---|---|---|---|
| 2002/0099897 | A1* | 7/2002 | Noguchi | G06F 13/102 710/305 |
| 2002/0174206 | A1* | 11/2002 | Moyer | G06F 9/4411 709/221 |
| 2003/0009604 | A1* | 1/2003 | Howard | G06F 9/4411 719/327 |
| 2003/0072029 | A1* | 4/2003 | Wiley | G06F 3/1204 358/1.15 |
| 2004/0216141 | A1* | 10/2004 | Shoji | G06F 9/4411 719/321 |
| 2004/0226024 | A1* | 11/2004 | Rosenbloom | G06F 13/102 719/321 |
| 2005/0172059 | A1* | 8/2005 | Yoshimura | G06F 9/54 710/110 |
| 2005/0246723 | A1 | 11/2005 | Bhesania et al. | |
| 2006/0136612 | A1* | 6/2006 | Aslot | G06F 13/102 710/22 |
| 2007/0198996 | A1* | 8/2007 | Chiu | G06F 9/4411 719/321 |
| 2008/0071962 | A1* | 3/2008 | Yang | G06F 9/4411 710/313 |
| 2008/0189720 | A1* | 8/2008 | Moertl | G06F 13/102 719/314 |
| 2009/0132737 | A1* | 5/2009 | Huang | H04L 12/2818 710/62 |
| 2009/0150909 | A1* | 6/2009 | Barreto | G06F 9/4411 719/324 |
| 2010/0169069 | A1* | 7/2010 | Diamant | G06F 13/385 703/24 |
| 2010/0228816 | A1* | 9/2010 | Jhou | G06F 3/1203 709/203 |
| 2010/0235545 | A1* | 9/2010 | Gouraud | G06F 13/102 710/5 |
| 2010/0235831 | A1* | 9/2010 | Dittmer | G06F 9/45558 718/1 |
| 2011/0131353 | A1 | 6/2011 | Tasler | |
| 2011/0202932 | A1* | 8/2011 | Borghini | G06F 9/54 719/321 |
| 2012/0131375 | A1* | 5/2012 | Adda | G06F 11/0793 714/2 |
| 2012/0243018 | A1* | 9/2012 | Shirota | G06F 13/102 358/1.13 |
| 2013/0321845 | A1* | 12/2013 | Takamoto | G06F 3/1206 358/1.13 |
| 2013/0346665 | A1* | 12/2013 | Freking | G06F 9/4411 710/313 |
| 2014/0055466 | A1* | 2/2014 | Petrov | G09G 5/363 345/520 |
| 2014/0095578 | A1* | 4/2014 | Rajendran | G06F 9/5044 709/203 |

FOREIGN PATENT DOCUMENTS

| | | |
|---|---|---|
| EP | 2083351 A1 | 7/2009 |
| JP | 2001-109698 | 4/2001 |
| JP | 2002-328878 | 11/2002 |
| JP | 2005-317019 | 11/2005 |
| JP | 2008-134701 | 6/2008 |
| JP | 2010-49734 | 3/2010 |
| JP | 2013-244628 | 12/2013 |
| WO | 2013173611 A1 | 11/2013 |
| WO | WO 2013173611 A1 * 11/2013 | ......... H04L 67/2814 |

OTHER PUBLICATIONS

EESR—Extended European Search Report of European Patent Application No. 15154676.9 dated May 8, 2015.

EPOA—Office Action of European Patent Application No. 15154676.9 dated May 2, 2017.

JPOA—Office Action of Japanese Patent Application No. 2014-038776 dated Sep. 5, 2017, with English translation.

CNOA—Office Action of China Patent Application No. 201510089192.2 dated Jul. 4, 2017, with English translation.

JPOA—Office Action of Japanese Patent Application No. 2014-038776 dated Mar. 6, 2018, with machine English translation.

* cited by examiner

|   | SERVICE ID | DRIVER LIBRARY | VALIDITY |
|---|---|---|---|
| 1 | svid#1 | driver-1-A | ✓ |
| 2 | svid#1 | driver-1-B |   |
| 3 | svid#2 | driver-2-A | ✓ |
| 4 | svid#3 | driver-3-B | ✓ |

TERMINAL DEVICE, EXTERNAL PERIPHERAL DEVICE AND EXTERNAL PERIPHERAL DEVICE CONTROL METHOD

CROSS-REFERENCE TO RELATED APPLICATION

This application is based upon and claims the benefit of priority of the prior Japanese Patent Application No. 2014-038776, filed on Feb. 28, 2014, the entire contents of which are incorporated herein by reference.

FIELD

The embodiments discussed herein are related to a terminal device, an external peripheral device, a server device, a device driver program, and an external peripheral device control method.

BACKGROUND

An external peripheral device (hereinafter, also referred to as an "external device") may be connected wiredly or wirelessly to a personal computer (hereinafter, also referred to as a "PC"). In order to control an external device connected to a PC from the PC, a device driver (hereinafter, also simply referred to as a "driver") is generally installed in the PC. The external device is a printer, a keyboard, a mouse, and a card reader, for example. A driver corresponding to each external device installed in a PC makes it possible to control the external device from the PC. In an operating system (hereinafter, also referred to as an "OS") used in a PC, such as Windows (registered trademark), a driver is incorporated in the OS as a part of the OS. Thus, the install of the driver in a PC is performed with administrative rights, which is different from the install of a typical application.

Recently, the "smart device" such as a smartphone and a tablet terminal has been used widely as a terminal device having the same functions as a PC. An OS used in the smart device, such as Android and iOS, does not allow a user to have administrative rights because of security, and thus the user himself/herself is not able to incorporate a driver in the OS. Therefore, external devices controllable through the smart device are generally limited to ones corresponding to drivers preliminarily incorporated in the OS before shipment of the smart device. For example, a driver of a keyboard is often incorporated preliminarily in an OS by a manufacturer of a smart device before shipment of the smart device, while a driver of a printer is hardly incorporated before shipment of a smart device.

As a method of allowing a smart device to control an external device with an OS in which the corresponding driver is not incorporated, an application dedicated to each external device is installed in the smart device. For example, in order to allow a smart device to control a printer having a function of a wireless local area network (hereinafter, also referred to as a "WLAN"), a manufacturer of the printer distributes a dedicated application. The user installs the dedicated application in the smart device, which enables the user to control the printer corresponding to the dedicated application from the smart device through a WLAN. Related-art examples are described, for example, in Japanese Laid-open Patent Publication No. 2001-109698, Japanese Laid-open Patent Publication No. 2008-134701, and Japanese Laid-open Patent Publication No. 2002-328878.

In a PC, drivers are incorporated in an OS, as described above. Thus, external devices corresponding to the drivers can be controlled through various applications operated on the OS. In a smart device, by contrast, a dedicated application is installed so as to allow control of a certain external device such as a printer from the smart device. Unlike a driver installed in a PC, the dedicated application is not incorporated in the OS of the smart device, and operates on the OS similarly to other applications. Moreover, there are no established communication means between applications. Thus, even when a dedicated application for allowing control of a certain external device is installed in the smart device, the certain external device corresponding to the dedicated application cannot be controlled by applications other than the dedicated application. For example, when a dedicated application for allowing printing of image data by a printer is installed and if the dedicated application does not allow printing of document data, any document data cannot be printed even when a document developing application is installed. Therefore, in the conventional smart device, in order to allow a plurality of applications to control the same printer, individual dedicated applications are used.

Here, such a dedicated application includes a function of transmitting and receiving a control command to and from an external device (hereinafter, also referred to as a "transmission and reception function"). There no established communication means between applications as described above. Thus, the transmission and reception function needs to be included individually in each application so as to allow control of an external device by the application. In this manner, individually providing each application with the transmission and reception function becomes a cause of an increase in the labor of developing applications and an increase in a data amount of applications.

Moreover, such a transmission and reception function depends on a communication system supported by the smart device. For example, even when a dedicated application has a transmission and reception function supported by Bluetooth (registered trademark), an external device cannot be controlled from a smart device unless the smart device in which the dedicated application is installed supports Bluetooth (registered trademark). Then, in developing a dedicated application that is commonly available in a plurality of smart devices supporting different communication systems, the dedicated application needs to include a plurality of transmission and reception functions corresponding to such communication systems. This fashion further increases the labor of developing applications and a data amount of applications.

SUMMARY

According to an aspect of an embodiment, a terminal device includes an operating system that does not allow a user to have right to incorporate a device driver in the operating system, a processor, and a memory that is capable of storing therein the operating system in which a first device driver is preliminarily incorporated and an application, wherein the application includes a second device driver that converts a first control command provided by the application into a second control command in a form deliverable to an external peripheral device, and the first device driver transmits the second control command output from the second device driver to the external peripheral device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the embodiments do not limit the terminal device, the external peripheral device, the server device, the device driver program, and the external peripheral device control method that are disclosed in the present application. Moreover, in the following embodiments, the components having the same function are represented with the same symbol, and the repeated explanation is omitted.

[a] First Embodiment

Configuration of Communication System, Terminal Device, and External Device

Figure 1:
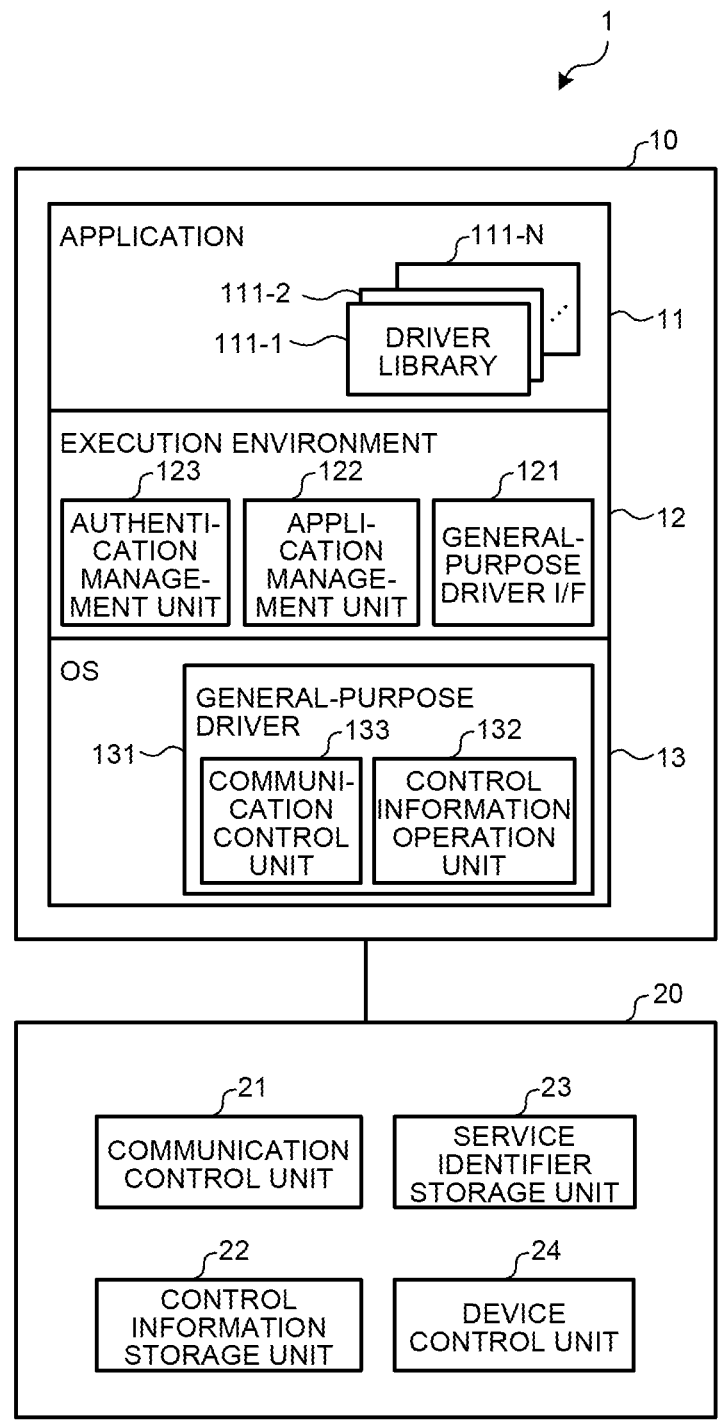
FIG. 1 is a diagram illustrating a configuration example of a communication system according to a first embodiment.

FIG. 1 illustrates a configuration example of a communication system according to a first embodiment. A communication system 1 illustrated in FIG. 1 includes a terminal device 10 and an external device 20. The terminal device 10 is a smart device such as a smartphone and a tablet terminal, for example. That is, the terminal device 10 is a terminal device including therein an OS 13 not allowing a user of the terminal device 10 to have right to incorporate a driver for controlling the external device 20 in the OS 13. The OS 13 of the terminal device 10 is Android or iOS, for example. The external device 20 is a printer or a card reader, for example. The terminal device 10 and the external device 20 are connected to each other wirelessly or wiredly.

The processing performed in the terminal device 10 is roughly divided into processing by an application 11, processing in an execution environment 12, and processing by the OS 13 in the order from the top. That is, in the terminal device 10, the software has a configuration of three layers of an application layer, an execution environment layer, and an OS layer in the order from the top.

The application 11 includes driver libraries 111-1 to 111-N. Hereinafter, when the driver libraries 111-1 to 111-N are not especially distinguished from one another, they are referred to as a "driver library 111". The application 11 including the driver library 111 is not installed in the terminal device 10 before shipment of the terminal device 10. The application 11 is installed in the terminal device 10 and stored in a memory in the terminal device 10 after shipment of the terminal device 10.

The execution environment 12 includes a general-purpose driver interface (I/F) 121, an application management unit 122, and an authentication management unit 123.

A general-purpose driver 131 is preliminarily incorporated in the OS 13 before shipment of the terminal device 10. The general-purpose driver 131 includes a control information operation unit 132 and a communication control unit 133.

The programs corresponding to the application 11, the execution environment 12, and the OS 13 are stored in the memory in the terminal device 10, and a processor in the terminal device 10 reads out the programs from the memory to execute them.

The general-purpose driver 131 has a transmission and reception function that is a function shared in applications. That is, the communication control unit 133 is connected to a communication control unit 21 of the external device 20 to perform transmission and reception of control commands to and from the external device 20 following a communication system supported by the terminal device 10. The wireless communication system includes wireless fidelity (Wi-Fi), Bluetooth (registered trademark), and near field communication (NFC), for example.

The control information operation unit 132 writes a control command in a control information storage unit 22 and reads out a control command from the control information storage unit 22, based on a request from the driver library 111 or a change of stored contents in the control information storage unit 22 of the external device 20. The reading and writing of a control command is performed through the communication control unit 133 and the communication control unit 21.

The general-purpose driver I/F 121 is an interface between the driver library 111 and the control information operation unit 132. The general-purpose driver I/F 121 is used when the driver library 111 mutually converts a control command in a form recognizable by the application 11 and a control command in a form deliverable to and from the external device 20.

The application management unit 122 manages correspondence between the activated application 11 and the external device 20 the activated application 11 is to use.

The authentication management unit 123 checks whether the authentication information from a user of the terminal device 10 is correct. The authentication management may be performed by simply inputting a personal identification number (PIN) code, for example, or by checking authentication information through communication with an integrated circuit (IC) card, for example.

The driver library 111 converts a control command from the application 11 to the external device 20 into a control command to be written in the control information operation unit 132, through the general-purpose driver I/F 121. Moreover, the driver library 111 converts a control command from the control information operation unit 132 into a control command in a form recognizable by the application 11, through the general-purpose driver I/F 121. That is, the driver library 111 mutually converts a control command recognizable by the application 11 and a control command in a form deliverable to and from the external device 20.

Moreover, each of the driver libraries 111-1 to 111-N is prepared to correspond to each of N pieces of external devices 20.

Meanwhile, the external device 20 includes the communication control unit 21, the control information storage unit 22, a service identifier storage unit 23, and a device control unit 24.

The communication control unit 21 is connected to the communication control unit 133 of the terminal device 10 to perform transmission and reception of control commands to and from the terminal device 10 following a communication system supported by the external device 20. The wireless communication system includes Wi-Fi, Bluetooth (registered trademark), and NFC, for example. The communication between the terminal device 10 and the external device 20 becomes possible with a communication system supported by both the terminal device 10 and the external device 20.

The service identifier storage unit 23 stores a "service identifier" enabling the terminal device 10 to uniquely identify what kind of service is provided by the external device 20. The terminal device 10 can recognize a service provided by the external device 20 by referring to such a service identifier. For example, when the external device 20 is a "printer", the service identifier is set to "1". When the external device 20 is a "card reader", the service identifier is set to "2".

The control information storage unit 22 stores control commands for controlling the external device 20. The recording form of control commands is defined in accordance with each service.

The device control unit 24 controls the external device 20 based on a control command stored in the control information storage unit 22. For example, when a command value "P" is written in a key A of the control information storage unit 22, the device control unit 24 performs operation "X" and writes a result "Q" in a key B.

Operation of Communication System, Terminal Device, and External Device

The following will explain the case in which the external device 20 is a printer and the application 11 of the terminal device 10 issues a printing command to the external device 20, as an example. In this case, the application 11 includes a printing driver library as the driver library 111.

In the service identifier storage unit 23 of the external device 20, the service identifier "1" indicating that the external device 20 is a printer providing a printing service is set and stored.

In the control information storage unit 22, storage areas corresponding respectively to keys A, B, C, D are allocated, for example, in which a "printing command" is stored in the key A, a "printing sheet" is stored in the key B, "printing data" is stored in the key C, and a "printing result" is stored in the key D.

The device control unit 24 monitors the keys A, B, C, D of the control information storage unit 22, and controls the external device 20 in accordance with the contents of each of the keys A, B, C, D once reading or writing relative to such keys occurred.

In the control information operation unit 132 of the terminal device 10, storages areas corresponding respectively to keys A, B, C, D are allocated, for example, similarly to the control information storage unit 22. Moreover, in the control information operation unit 132, a "printing command" is stored in the key A, a "printing sheet" is stored in the key B, "printing data" is stored in the key C, and a "printing result" is stored in the key D, in the keys A, B, C, D of the storage areas corresponding to the service identifier "1".

The driver library 111 converts a "first control command" provided by the application 11 into a "second control command" in a form deliverable to the external device 20 and writes the second control command in the control information operation unit 132. That is, the "first control command" is a control command in a form recognizable by the application 11.

For example, the application 11 provides, as a first control command, a command for "printing text data on an A4-sized sheet" to the driver library 111. In this case, the driver library 111 converts the first control command for "printing text data on an A4-sized sheet" into a second control command, through the general-purpose driver I/F 121. For example, the driver library 111 converts the first control command into the second control command for writing "print" in the key A, "A4" in the key B, and "text data" in the key C. Then, the driver library 111 writes the second control command after conversion in the storage area corresponding to the service identifier "1" of the control information operation unit 132, through the general-purpose driver I/F 121. Moreover, the driver library 111 monitors a value of the key D of the control information operation unit 132.

The control information operation unit 132 in which the second control command after conversion has been written outputs the second control command to the communication control unit 133, and the communication control unit 133 transmits the input second control command to the communication control unit 21 of the external device 20.

In the external device 20, the communication control unit 21 having received the second control command writes the received second control command in the control information storage unit 22.

That is, the control information operation unit 132 performs processing of writing the second control command after conversion in the control information storage unit 22, through the communication control unit 133 and the communication control unit 21.

Upon detecting that the contents of the control information storage unit 22 have been rewritten, the device control unit 24 reads the second control command from the control information storage unit 22. The device control unit 24 having read the second control command recognizes that the key A is "print" and the key B is "A4", and performs processing of printing the "text data" included in the key C on an A4-sized sheet. After the printing is completed, the device control unit 24 writes "0" that is a value indicating printing completion in the key D of the control information storage unit 22.

In the terminal device 10, the control information operation unit 132 receives a notification indicating that the value of the key D is rewritten to "0" from the control information storage unit 22, through the communication control unit 21 and the communication control unit 133. The control information operation unit 132 transfers the notification to the driver library 111 through the general-purpose driver I/F 121.

Upon receiving the notification, the driver library 111 orders, through the general-purpose driver I/F 121, the control information operation unit 132 to read the value of the key D from the control information storage unit 22.

Upon receiving the order, the control information operation unit 132 reads the value of the key D from the control information storage unit 22, through the communication control unit 21 and the communication control unit 133, and transmits the read value "0" of the key D to the driver library 111 through the general-purpose driver I/F 121.

In response to the first control command for "printing text data on an A4-sized sheet" provided by the application 11, the driver library 111 having recognized that the value of the key D is "0" transmits the result "printing completion" to the application 11.

Processing of Terminal Device

Figure 2:
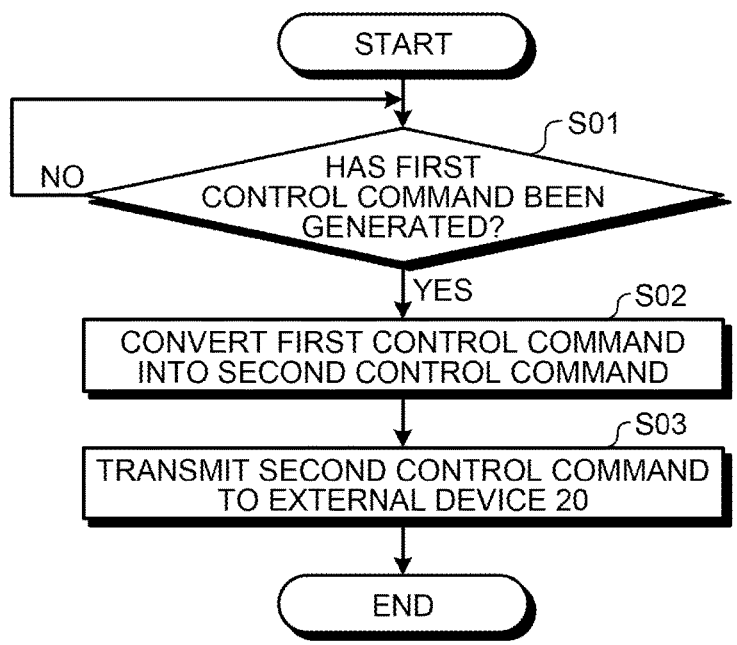
FIG. 2 is a flowchart for explaining processing of a terminal device according to the first embodiment.

FIG. 2 is a flowchart for explaining processing of a terminal device according to the first embodiment.

The driver library 111 waits until a first control command is generated in the application 11 (No at Step S01).

When the first control command is generated in the application 11 and provided by the application 11 (Yes at Step S01), the driver library 111 converts the first control command into a second control command and writes the second control command in the control information operation unit 132 (Step S02).

The communication control unit 133 transmits the second control command written in the control information operation unit 132 to the external device 20 (Step S03).

As described above, in the first embodiment, the terminal device 10 is a terminal device including therein the OS 13 not allowing a user to have right to incorporate a driver in the OS 13. The general-purpose driver 131 is preliminarily incorporated in the OS 13. Meanwhile, the driver library 111 is included in the application 11. The application 11 provides the first control command in a form recognizable by the application 11 to the driver library 111, and the driver library 111 converts the first control command into the second control command in a form deliverable to the external device 20. The general-purpose driver 131 transmits the second control command after conversion output from the driver library 111 to the external device 20.

The transmission and reception function is a function for simply transmitting and receiving a control command, and thus can be shared by the applications 11. Then, the general-purpose driver 131 having a transmission and reception function is preliminarily incorporated in the OS 13. Meanwhile, the application 11 includes the driver library 111 having a function of converting the first control command in a form recognizable by each application 11 into the second control command in a form deliverable to the external device 20. Such a control command conversion function is one of functions other than the transmission and reception function. That is, in the first embodiment, the general-purpose driver 131 having the transmission and reception function that can be shared by the applications 11 is preliminarily incorporated in the OS 13, while the driver library 111 having a function other than the transmission and reception function is included in each application 11.

In this manner, each application 11 does not need to have a transmission and reception function that can be shared by the applications 11. Thus, the application 11 does not depend on a communication system allowing the terminal device 10 to perform communication. Moreover, a developer of the application 11 can develop the application 11 without considering a communication system allowing the terminal device 10 to perform communication. Therefore, according to the first embodiment, it is possible to reduce the labor of developing the application 11 enabling control of the external device 20 from the terminal device 10 that is a smart device.

Moreover, according to the first embodiment, the application 11 includes the driver library 111 corresponding to the external device 20. Thus, only with install of the application 11 in the terminal device 10, the external device 20 can be controlled from the terminal device 10 without installing an additional driver for the external device 20. That is, the driver library 111 is installed at the same time of install of the application 11, which removes the labor of preliminarily installing the driver library 111 before execution of the application 11. In this manner, the first embodiment enables the user to control the external device 20 by only executing the application 11 without considering preliminary install of the driver library 111.

[b] Second Embodiment

The second embodiment is different from the first embodiment in that an external device has the same configuration as a terminal device.

Configuration of Communication System, Terminal Device, and External Device

Figure 3:
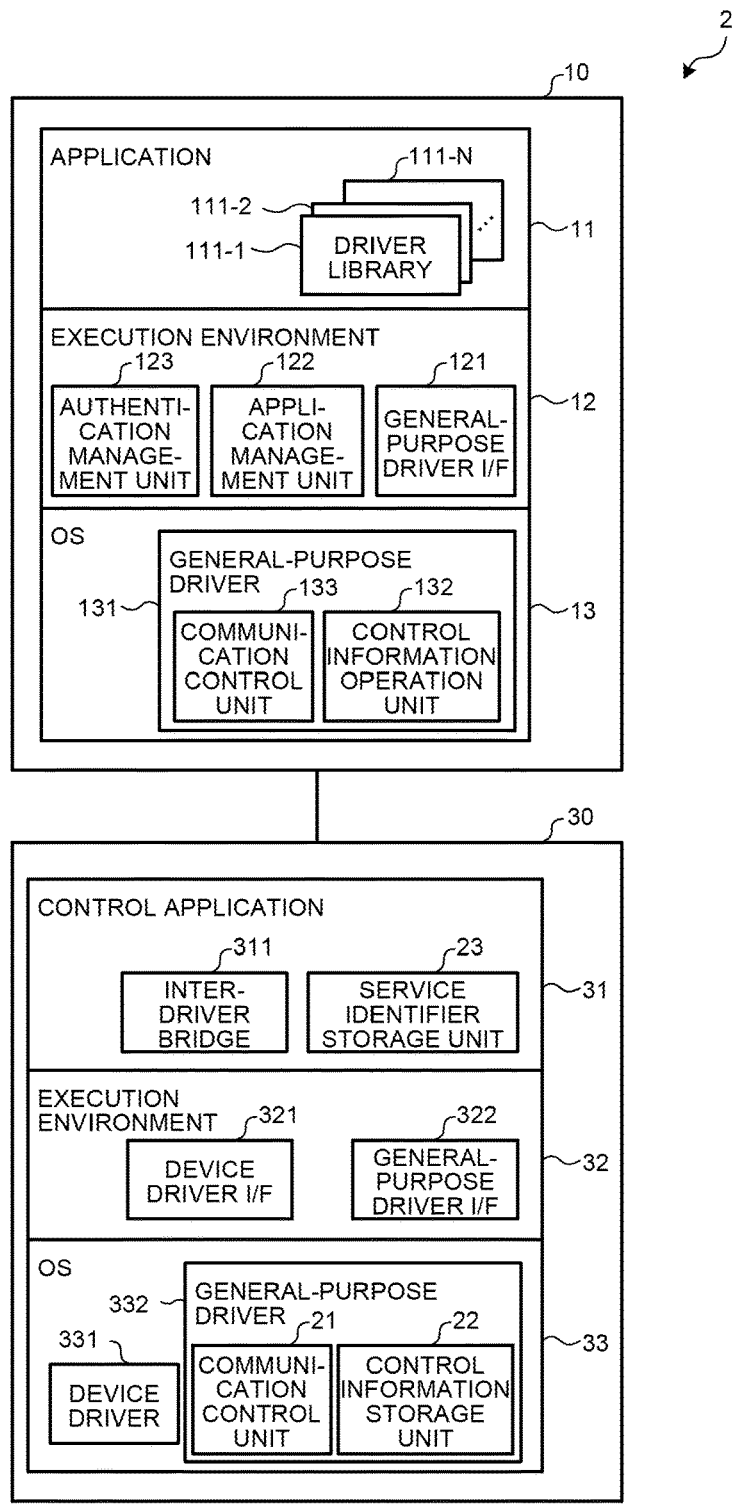
FIG. 3 is a diagram illustrating a configuration example of a communication system according to a second embodiment.

FIG. 3 is a diagram illustrating a configuration example of a communication system according to a second embodiment. A communication system 2 illustrated in FIG. 3 includes the terminal device 10 and an external device 30. The terminal device 10 is same as in the first embodiment, and thus the explanation thereof is omitted.

The terminal device 10 and the external device 30 are connected to each other wirelessly or wiredly, and the external device 30 can perform communication with the terminal device 10.

The processing performed in the external device 30 is roughly divided into processing by a control application 31, processing in an execution environment 32, and processing by an OS 33 in the order from the top. That is, in the external device 30, the software has a configuration of three layers of an application layer, an execution environment layer, and an OS layer in the order from the top, similarly to the terminal device 10.

The control application 31 includes an inter-driver bridge 311 and the service identifier storage unit 23.

The execution environment 32 includes a device driver I/F 321 and a general-purpose driver I/F 322.

The OS 33 includes a device driver 331 and a general-purpose driver 332. The general-purpose driver 332 is preliminarily incorporated in the OS 33 before shipment of the external device 30, whereas the device driver 331 is installed and incorporated in the OS 33 by the user after shipment of the external device 30. The general-purpose driver 332 includes the control information storage unit 22 and the communication control unit 21. The device driver 331 is a program for operating hardware of the external device 30, and a manufacturer of the external device 30 generally provides the program corresponding to the OS 33 as the device driver 331.

The programs corresponding to the control application 31, the execution environment 32, and the OS 33 are stored in a memory in the external device 30, and a processor in the external device 30 reads out the programs from the memory to execute them.

Here, the inter-driver bridge 311 has the same function as the driver library 111 of the terminal device 10, and the general-purpose driver I/F 322 has the same function as the general-purpose driver I/F 121 of the terminal device 10. Moreover, the general-purpose driver 332 has the same function as the general-purpose driver 131 of the terminal device 10.

That is, the general-purpose driver 332 has a transmission and reception function that is a function shared by control applications, and the communication control unit 21 is connected to the communication control unit 133 of the terminal device 10 to perform transmission and reception of control commands to and from the terminal device 10 following a communication system supported by the external device 30.

The general-purpose driver I/F 322 is an interface between the inter-driver bridge 311 and the control information storage unit 22.

The device driver I/F 321 is an interface between the inter-driver bridge 311 and the device driver 331.

The inter-driver bridge 311 converts a control command written in the control information storage unit 22 into a control command recognizable by the device driver 331, through the device driver I/F 321. Moreover, the inter-driver bridge 311 converts a control command from the device driver 331 into a control command to be written in the control information storage unit 22, through the general-purpose driver I/F 322. That is, the inter-driver bridge 311 mutually converts a control command in a form recognizable by the device driver 331 and a control command in a form deliverable to and from the terminal device 10.

For example, upon detecting that a command value has been written in the key A of the control information storage unit 22, the general-purpose driver I/F 322 notifies the inter-driver bridge 311 of such detection. The inter-driver bridge 311 reads the command value "P" written in the key A from the control information storage unit 22 based on the notification, and converts the command value "P" into a command "X" corresponding to the command value "P" through the device driver I/F 321, and outputs the command "X" after conversion to the device driver 331. Moreover, upon detecting a command "Y" from the device driver 331, the device driver I/F 321 notifies the inter-driver bridge 311 of the command "Y". The inter-driver bridge 311 converts the command "Y" into a command value "Q" through the general-purpose driver I/F 322, and writes the command value "Q" after conversion in the key B of the control information storage unit 22.

Operation of Communication System, Terminal Device, and External Device

The following will explain the case in which the external device 30 is a printer and the application 11 of the terminal device 10 transmits a printing command to the external device 30, as an example, similarly to the first embodiment.

Note that the operation of the terminal device 10 is same as in the first embodiment, and thus the explanation thereof is omitted.

The inter-driver bridge 311 monitors notifications from the device driver I/F 321 and the general-purpose driver I/F 322. The general-purpose driver I/F 322 monitors the key A in the control information storage unit 22.

When some data is written in the key A of the control information storage unit 22, the general-purpose driver I/F 322 detects the writing and notifies the inter-driver bridge 311 of such detection. Upon receiving the notification, the inter-driver bridge 311 reads a command value "print" written in the key A from the control information storage unit 22 and converts the command value "print" into a "printing command" recognizable by the device driver 331. Moreover, the inter-driver bridge 311 reads values of the keys B, C related to the key A from the control information storage unit 22. Upon reading out the values, the inter-driver bridge 311 transmits the "printing command", a sheet size "A4" that is a value of the key B, and a printed object "text data" that is a value of the key C to the device driver 331 through the device driver I/F 321. The device driver 331 performs the printing of the text data on an A4-sized sheet.

Furthermore, the following will explain the case in which the external device 30 is an NFC reader, as an example.

When an NFC tag is brought close to the external device 30 that is an NFC reader, the device driver 331 detects approach of the NFC tag, reads data stored in a certain area of the NFC tag, and transmits the data to the device driver I/F 321. The device driver I/F 321 makes the data transmitted from the device driver 331 into a given format, and transmits the resulting data to the inter-driver bridge 311. For example, the device driver I/F 321 interprets the data from the 32nd byte to the 128th byte in the head, as a character string, and makes the data into a given format. The device driver I/F 321 transmits the data after formatting to the inter-driver bridge 311. The inter-driver bridge 311 converts the data after formatting into a control command in a form for writing in the control information storage unit 22, through the general-purpose driver I/F 322, and writes a value "NFCread" in a key H of the control information storage unit 22 and the above-mentioned character string in a key I thereof.

As described above, in the second embodiment, the external device 30 can perform communication with the terminal device 10. The control information storage unit 22 stores control commands from the terminal device 10. The device driver 331 can be incorporated in the OS 33. The inter-driver bridge 311 convert the control command stored in the control information storage unit 22 into a control command recognizable by the device driver 331.

In this manner, in the second embodiment, the external device 30 also converts the control command using the inter-driver bridge 311 included in the control application 31, similarly to the terminal device 10. Thus, the application of the terminal device 10 and the control application 31 of the external device 30 can be cooperated with each other. Therefore, regarding the control of the external device 30, the control with high degree of freedom is possible without depending on the design of the device driver 331 provided by a manufacturer of the external device 30.

[c] Third Embodiment

The third embodiment is different from the second embodiment in that an application to be installed in a terminal device is distributed from a server device.

Figure 4:
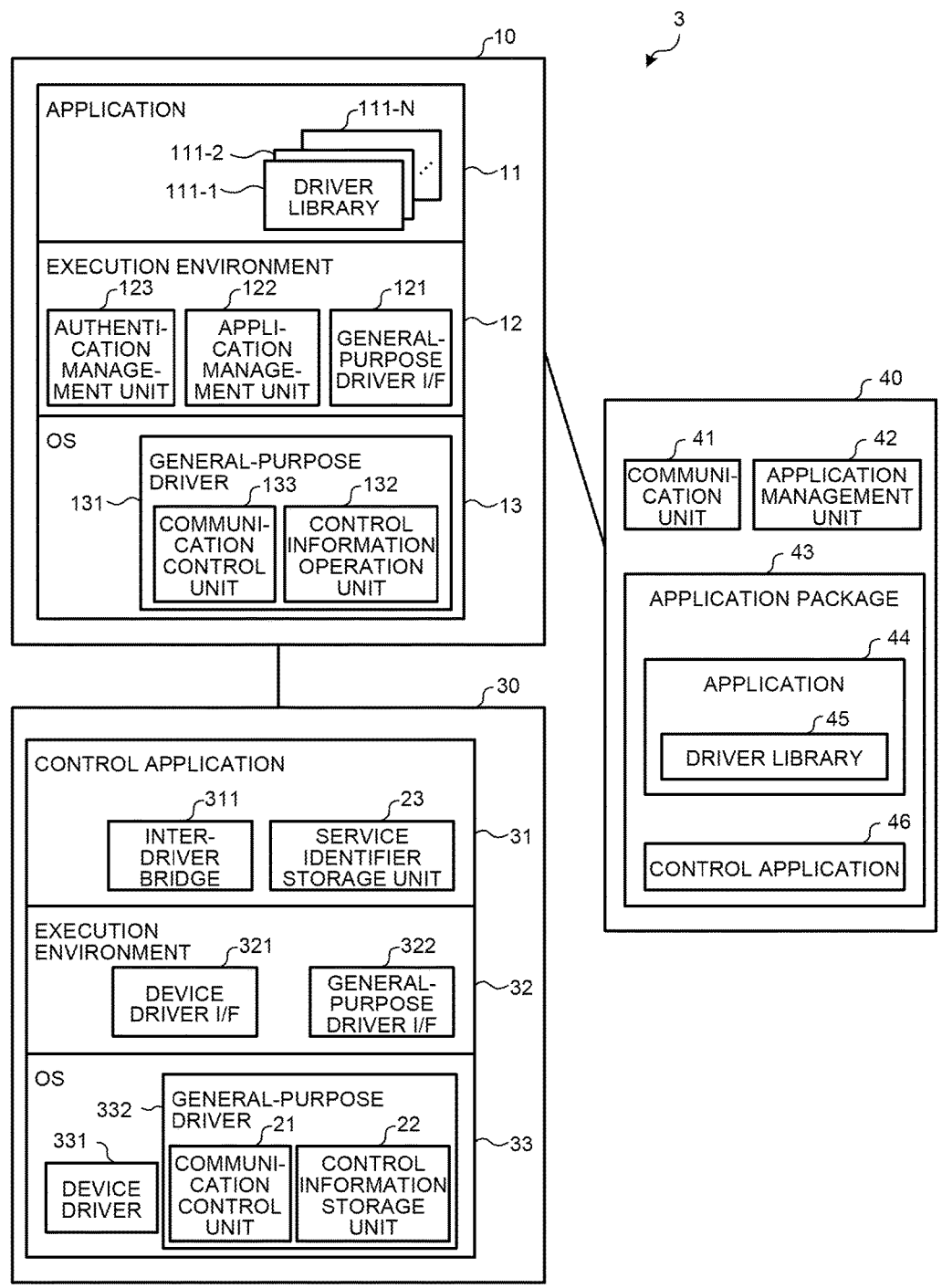
FIG. 4 is a diagram illustrating a configuration example of a communication system according to a third embodiment.

Configurations of Communication System, Terminal Device, External Device, and Server Device FIG. 4 is a diagram illustrating a configuration example of a communication system according to a third embodiment. A communication system 3 illustrated in FIG. 4 includes the terminal device 10, the external device 30, and a server device 40. The terminal device 10 is same as in the first embodiment, and thus the explanation thereof is omitted. Moreover, the terminal device 30 is same as in the second embodiment, and thus the explanation thereof is omitted.

The server device 40 is connected to the terminal device 10 wirelessly or wiredly, and can perform communication with the terminal device 10.

The server device 40 includes a communication unit 41, an application management unit 42, and an application package 43.

The application package 43 is stored in a storage unit (not illustrated) in the server device 40. The storage unit is implemented with a hard disk drive (HDD) or a memory, for example. The application package 43 includes an application 44 and a control application 46 corresponding to the application 44. Moreover, the application 44 includes a driver library 45. The application 44 corresponds to the application 11 installed in the terminal device 10, and the driver library 45 thus corresponds to the driver library 111. In addition, the control application 46 corresponds to the control application 31 installed in the external device 30.

The communication unit 41 is connected to the terminal device 10 to perform communication with the terminal device 10 following a communication system supported by the server device 40. The wireless communication system includes Wi-Fi, 3G, and LTE, for example.

The application management unit 42 selects an application package 43 corresponding to a request of the terminal device 10 among a plurality of application packages 43, and transmits the application package 43 to the terminal device 10 through the communication unit 41.

Operation of Communication System, Terminal Device, External Device, and Server Device The following will explain the operation until the application 11 of the terminal device 10 and the control application 31 of the external device 30 are activated, as an example.

The application management unit 122 of the terminal device 10 has a function of browsing and acquiring a group of application packages in the server device 40. The group of application packages includes application packages 43.

The user selects a desired application through an interface provided by the application management unit 122, and orders the application management unit 122 to download the desired application. The interface provided by the application management unit 122 includes an application of Google Play or Apple App Store, for example.

Upon receiving the order for downloading, the application management unit 122 requests the server device 40 to permit the download of the desired application, through the communication control unit 133. For example, when the server device 40 is constituted based on a web server, a request of "https://appserver.example.com/app_request?app_id=123456789" is transmitted to the server device 40.

Upon receiving the above-described request, the communication unit 41 of the server device 40 transfers the request to the application management unit 42.

The application management unit 42 interprets the request, selects and acquires the application package 43 corresponding to the request among the group of application packages, and outputs the acquired application package 43 to the communication unit 41. Upon receiving the request of "https://appserver.example.com/app_request?app_id=123456789", for example, the application management unit 42 selects the application package 43 whose identification number is "123456789" among the group of application packages.

The communication unit 41 transmits the application package 43 acquired by the application management unit 42 to the terminal device 10.

Upon receiving the application package 43 through the communication control unit 133, the application management unit 122 takes out the application 44 including the driver library 45 from the application package 43 and stores the application 44 in the memory. In this manner, the application 44 including the driver library 45 is downloaded to the terminal device 10 from the server device 40. When the user activates the downloaded application 44, the application 44 and the driver library 45 are executed on the execution environment 12. Note that the application 44 may be activated automatically when downloaded.

Moreover, the application management unit 122 takes out the control application 46 from the application package 43, and transmits the taken-out control application 46 to the external device 30 through the communication control unit 133.

The external device 30 executes the control application 46 received through the communication control unit 21.

Note that when the server device 40 can perform communication also with the external device 30, the external device 30 may acquire the control application 46 directly from the server device 40 without the terminal device 10 interposed.

In this manner, in the third embodiment, the server device 40 can perform communication with the terminal device 10. The server device 40 stores the applications 44 including the driver library 45. The communication unit 41 transmits the application package 43 including the applications 44 to the terminal device 10.

In this manner, when the user of the terminal device 10 wants to control the external device 30, the user can control the external device 30 from the terminal device 10 by only downloading the application 44 from the server device 40 and executing the application 44 without installing an additional driver for the external device 30 in the terminal device 10.

[d] Fourth Embodiment

Figure 12:
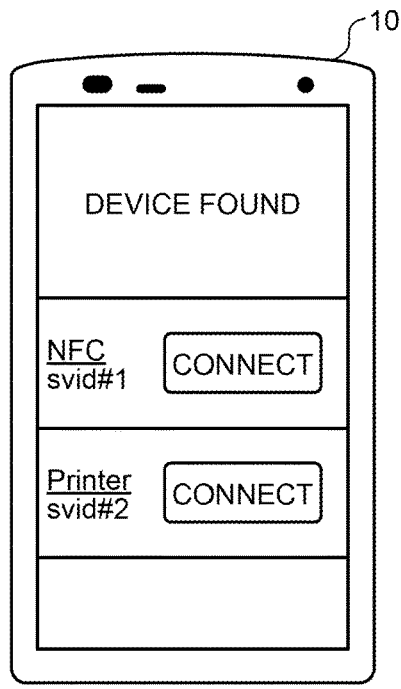
FIG. 12 is a diagram illustrating a screen display example of a terminal device according to the fourth embodiment.
Figure 13:
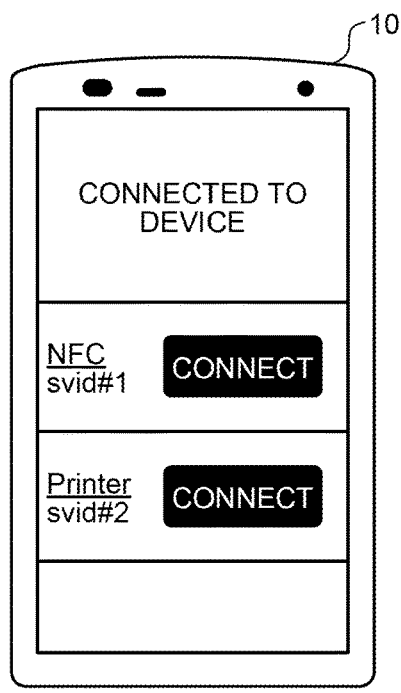
FIG. 13 is a diagram illustrating a screen display example of the terminal device according to the fourth embodiment.

The fourth embodiment will explain an application example of the communication system 3 of the third embodiment. FIGS. 5 to 11, 14, and 16 are diagrams for explaining operation of the communication system according to the fourth embodiment. FIGS. 12, 13, and 15 are diagrams illustrating a screen display example of the terminal device according to the fourth embodiment. FIGS. 5 to 16 are arranged in time series.

Figure 5:
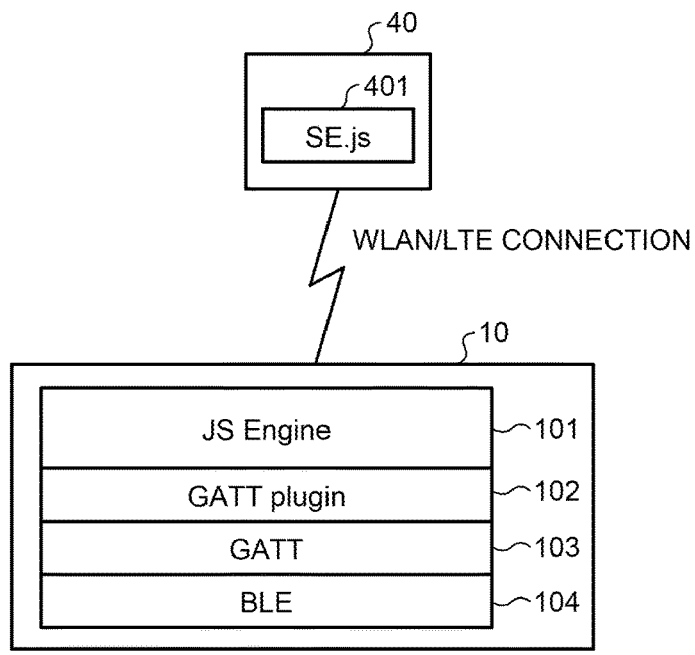
FIG. 5 is a diagram for explaining operation of a communication system according to a fourth embodiment.
Figure 6:
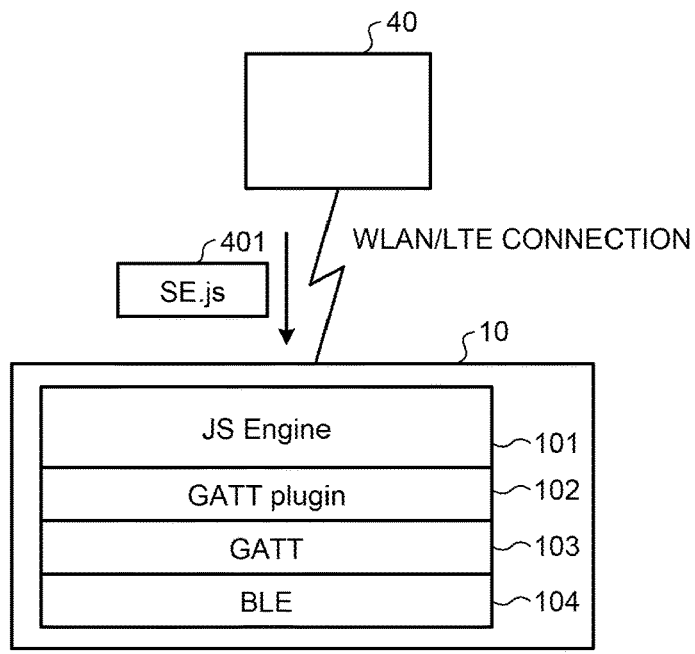
FIG. 6 is a diagram for explaining operation of the communication system according to the fourth embodiment.

In FIG. 5, a JavaScript (registered trademark) (JS) engine 101, a general attribute profile (GATT) plug-in 102 for recording general-purpose attribute information, and a GATT 103 are preliminarily installed in the terminal device 10 before shipment of the terminal device 10. Moreover, the terminal device 10 includes a Bluetooth low energy (BLE) communication module (Bluetooth: registered trademark), and a BLE driver 104 for the BLE communication module is preliminarily installed in the terminal device 10 before shipment of the terminal device 10. The JS engine 101 corresponds to the execution environment 12, the GATT plug-in 102 corresponds to the general-purpose driver I/F 121, the GATT 103 corresponds to the control information operation unit 132, and the BLE driver 104 corresponds to the communication control unit 133. In such a state, the terminal device 10 is connected to the server device 40 wirelessly to download an SE.js 401 from the server device 40 (FIG. 6) and install the SE.js 401 in the terminal device 10 (FIG. 7).

Figure 7:
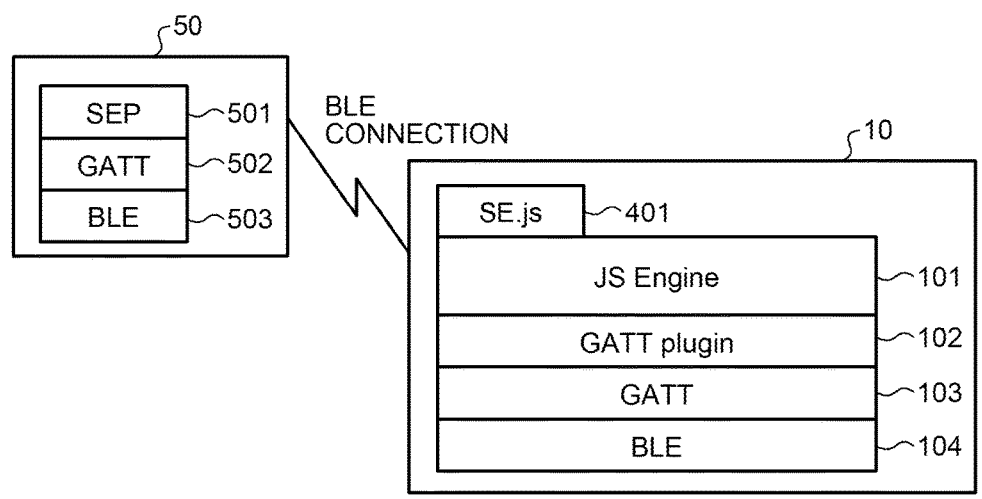
FIG. 7 is a diagram for explaining operation of the communication system according to the fourth embodiment.

Next, in FIG. 7, the terminal device 10 performs BLE connection with a secure element (SE) 50 for holding information for identifying an individual. In the SE 50, a secure element profile (SEP) 501 and a GATT 502 are installed. Moreover, the SE 50 includes a BLE communication module, and a BLE driver 503 for the BLE communication module is installed in the SE 50. The SE.js 401 corresponds to the driver library 111-1 for the SE 50.

Figure 8:
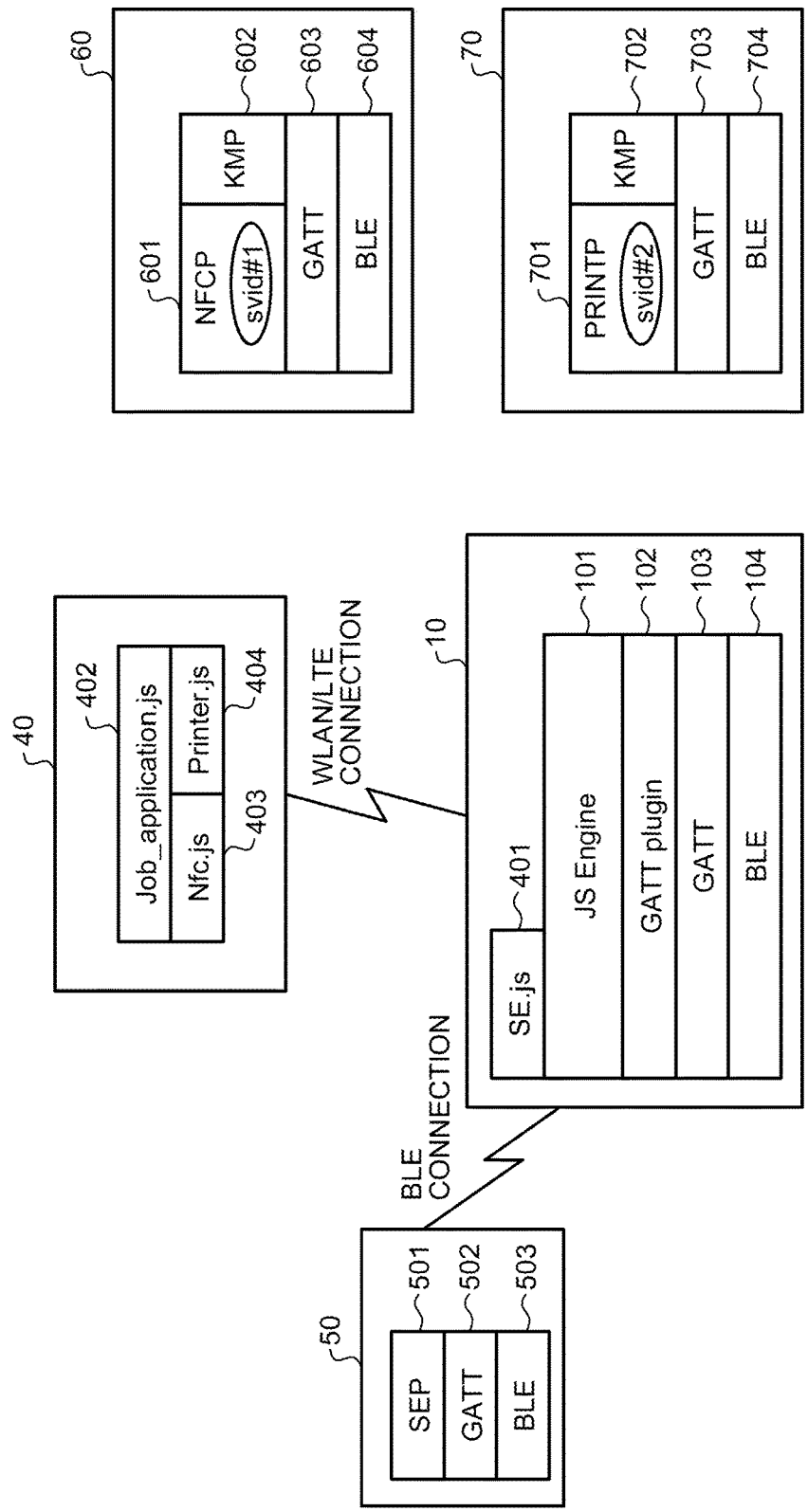
FIG. 8 is a diagram for explaining operation of the communication system according to the fourth embodiment.
Figure 9:
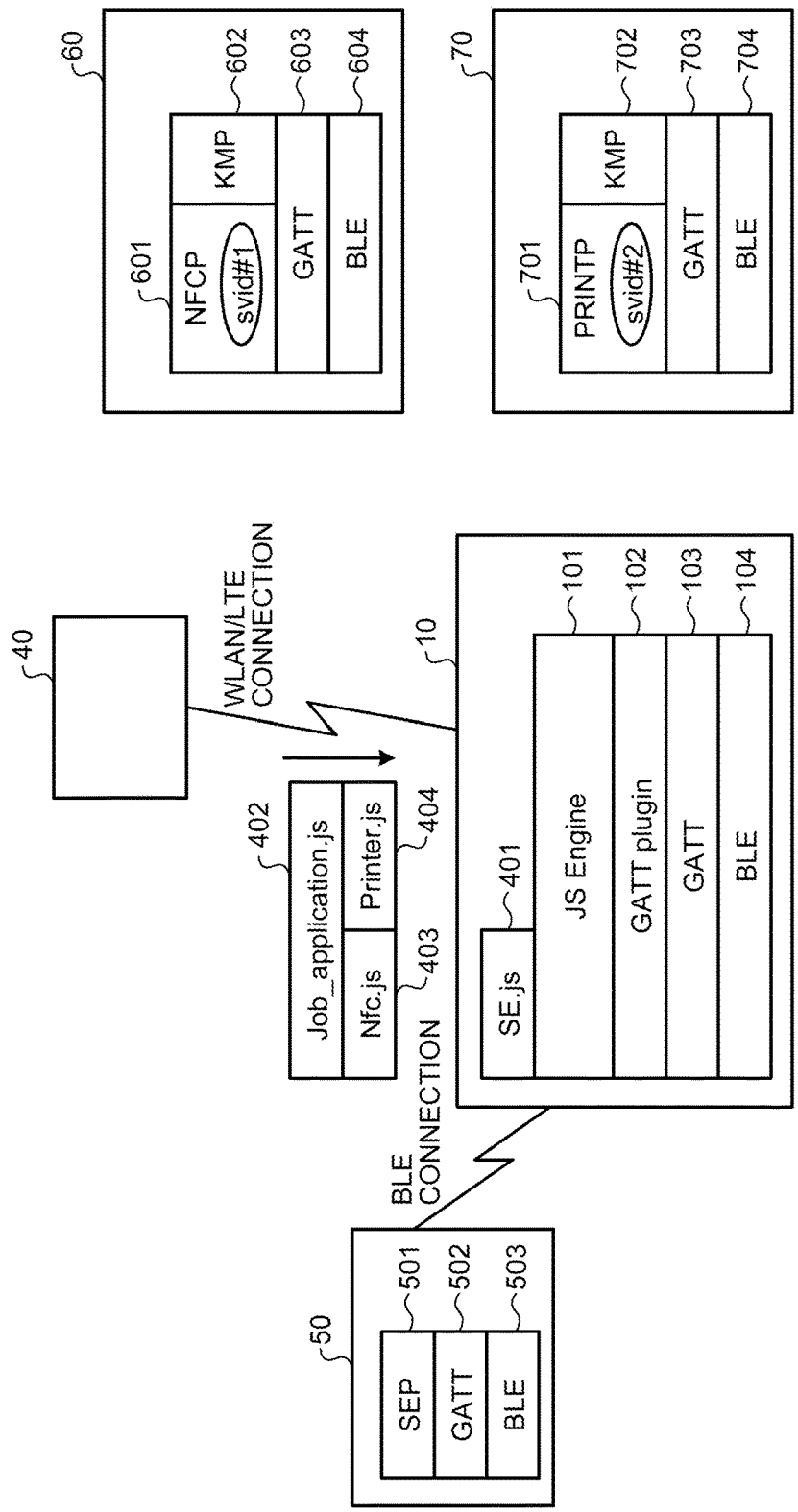
FIG. 9 is a diagram for explaining operation of the communication system according to the fourth embodiment.

Subsequently, in FIG. 8, the terminal device 10 enters a store where a card reader 60 and a printer 70 are installed as external devices. Upon entering the store, the terminal device 10 downloads a Job_application.js 402 including an Nfc.js 403 and a Printer.js 404 from the server device 40 and installs the Job_application.js 402 in the terminal device 10 (FIG. 9). The Job_application.js 402 corresponds to the application 11. The Nfc.js 403 corresponds to the driver library 111-2 for the card reader 60, and the Printer.js 404 corresponds to the driver library 111-3 for the printer 70.

In the card reader 60, an NFC profile (NFCP) 601 for reading and writing an NFC tag, a key management profile (KMP) 602 for managing key information, and a GATT 603 are installed. Moreover, the card reader 60 includes a BLE communication module, and a BLE driver 604 for the BLE communication module is installed in the card reader 60. The card reader 60 is provided with a svid#1 as a service identifier, and the svid#1 is held in the NFCP 601.

In the printer 70, a printer profile (PRINTP) 701 for printing, a KMP 702, and a GATT 703 are installed. Moreover, the printer 70 includes a BLE communication module, and a BLE driver 704 for the BLE communication module is installed in the printer 70. The printer 70 is provided with an svid#2 as a service identifier, and the svid#2 is held in the PRINTP 701.

Subsequently, in FIG. 10, when the Job_application.js 402 is activated in the terminal device 10, an employee ID is checked between the SE.js 401 of the terminal device 10 and the SEP 501 of the SE 50. The SE.js 401 checks whether an employee ID held by the SEP 501 matches an employee ID held by the SE.js 401. The SE.js 401 determines user authentication to be "OK" when the IDs are matched, whereas the SE.js 401 determines user authentication to be "FAILURE" when the IDs are not matched.

Figure 10:
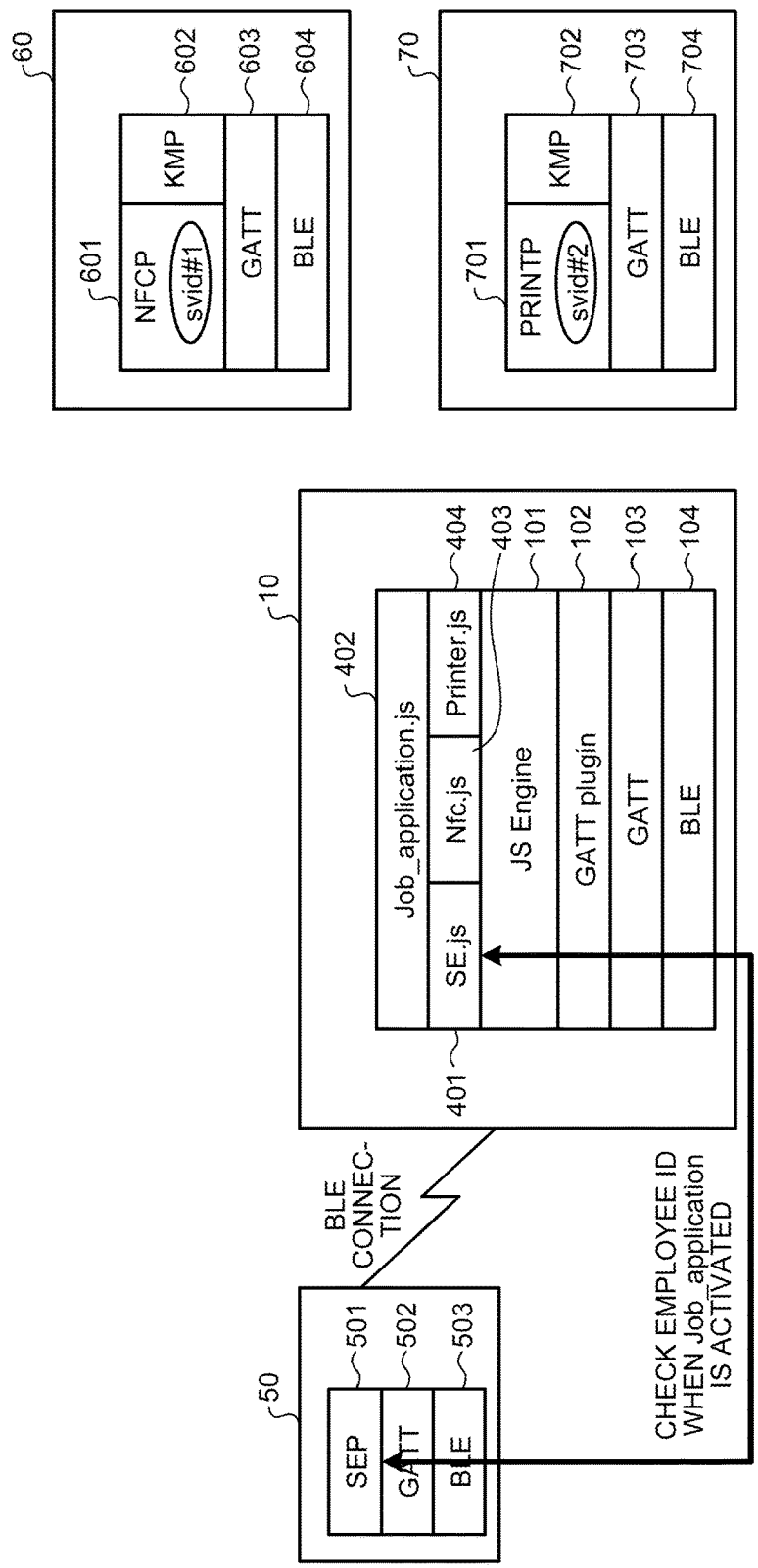
FIG. 10 is a diagram for explaining operation of the communication system according to the fourth embodiment.
Figure 11:
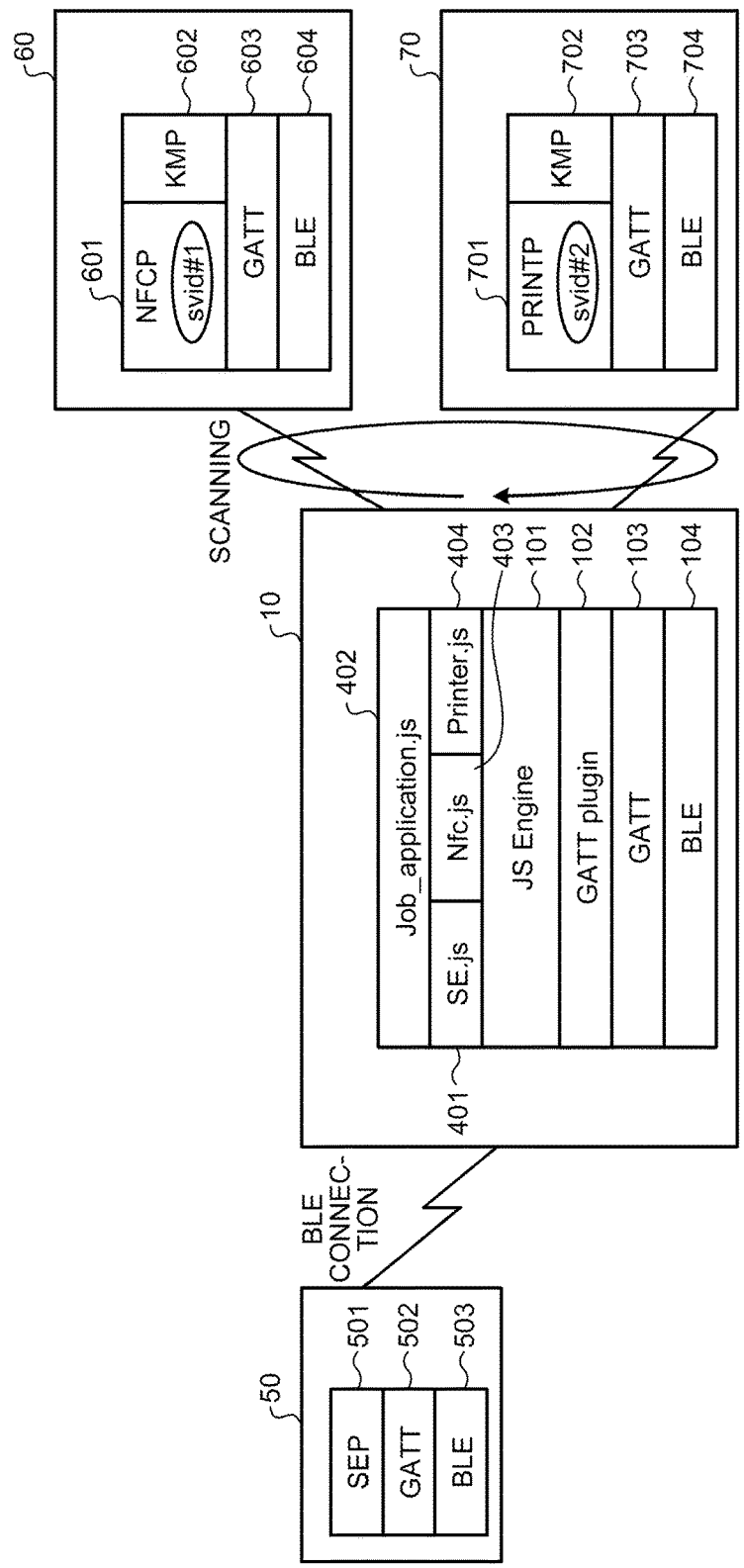
FIG. 11 is a diagram for explaining operation of the communication system according to the fourth embodiment.

When the user authentication is "OK" in FIG. 10, the terminal device 10 then scans the external devices in FIG. 11. In response to such scanning, the card reader 60 advertises the svid#1 to the terminal device 10, and the printer 70 advertises the svid#2 to the terminal device 10. As a result of the advertisement, display as illustrated in FIG. 12 is made on a screen of the terminal device 10. Note that in scanning of external devices in the terminal device 10, all of advertised service identifiers are not displayed, and only service identifiers corresponding to the driver libraries included in the Job_application.js 402 are displayed. Here, a list of service identifiers to be scanned may be preliminarily held to reduce power consumption of the terminal device 10 by preventing scanning of devices having service identifiers other than the service identifiers on the list. Then, when the user touches a connection button, the terminal device 10 starts BLE connection with the card reader 60 and the printer 70, and the screen display of the terminal device 10 is shifted to one in FIG. 13.

Figure 14:
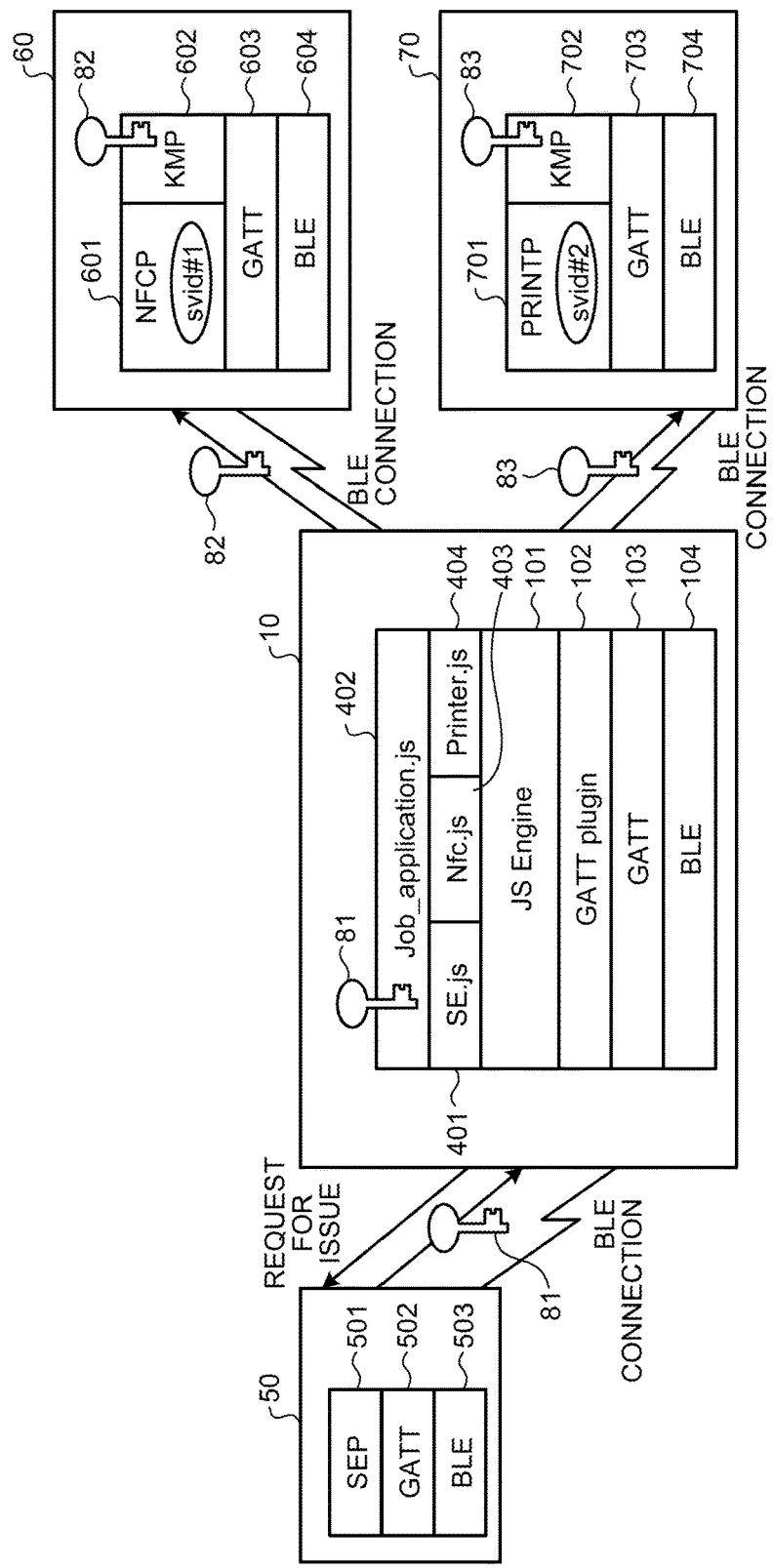
FIG. 14 is a diagram for explaining operation of the communication system according to the fourth embodiment.
Figure 15:
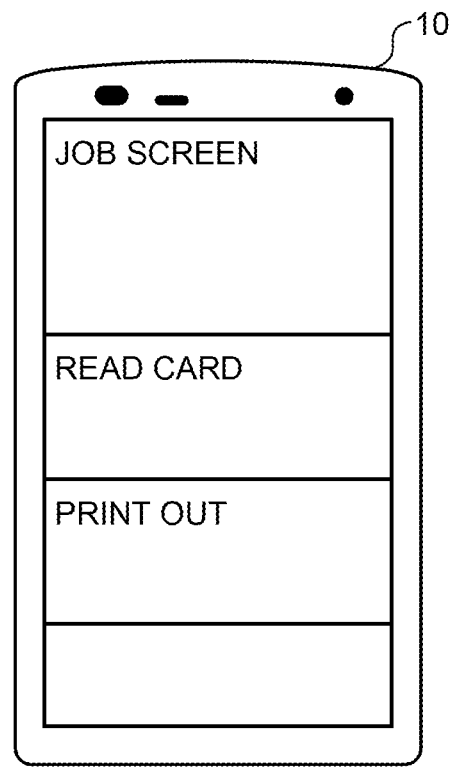
FIG. 15 is a diagram illustrating a screen display example of the terminal device according to the fourth embodiment.

Next, in FIG. 14, the terminal device 10 requests the SE 50 to issue a temporary key, from the SE.js 401 through the SEP 501, based on the employee ID, and acquires a temporary key 81 from the SE 50. The terminal device 10 generates session keys 82, 83 different for each external device based on the temporary key 81. The terminal device 10 transmits the session key 82 to the card reader 60, from the SE.js 401 through the KMP 602. Moreover, the terminal device 10 transmits the session key 83 to the printer 70, from the SE.js 401 through the KMP 702.

Figure 16:
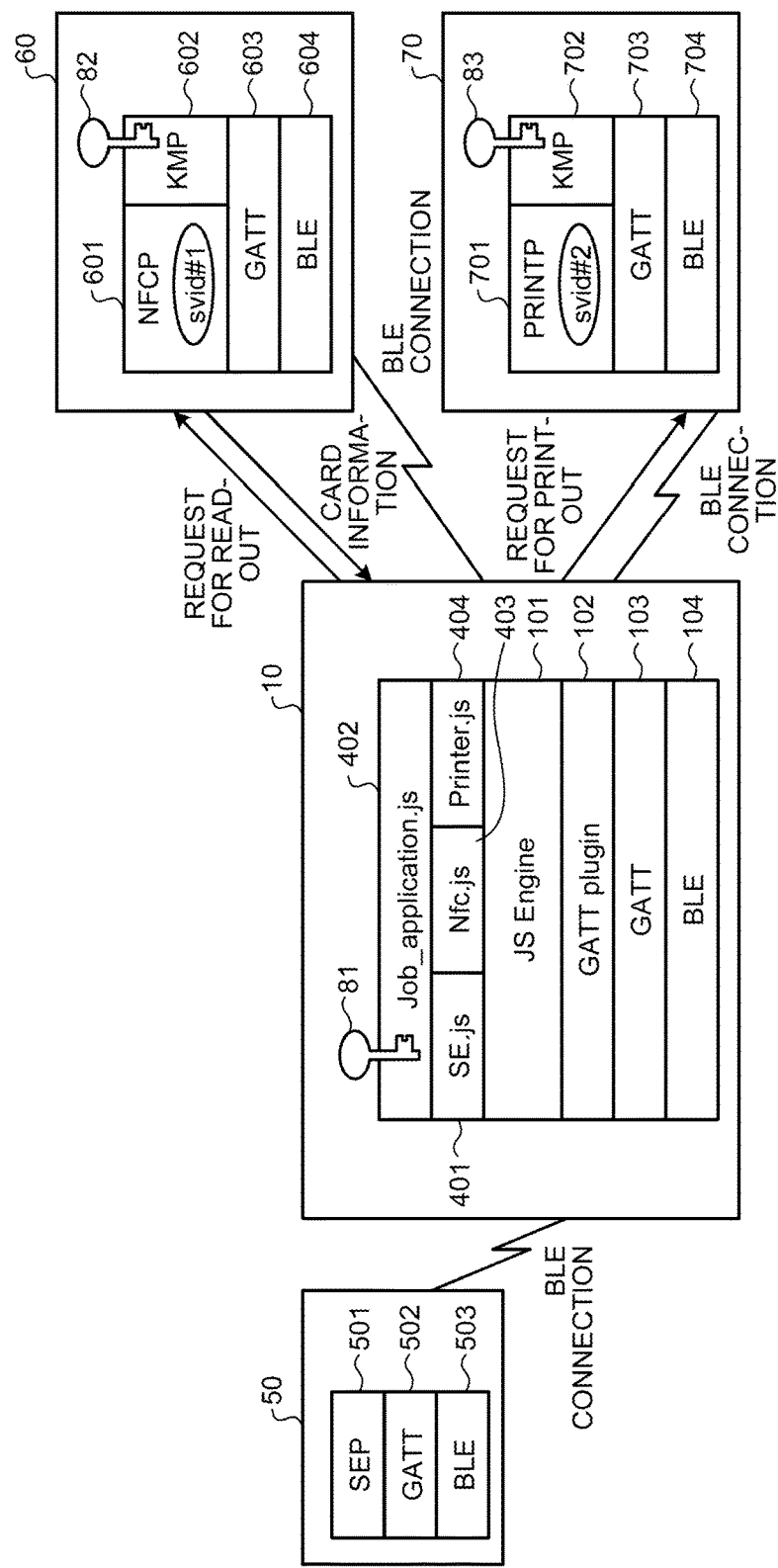
FIG. 16 is a diagram for explaining operation of the communication system according to the fourth embodiment.

Subsequently, in FIG. 15, when a "read card" button on the screen of the terminal device 10 is touched, the terminal device 10 requests the card reader 60 to read a card, from the Nfc.js 403 through the NFCP 601. In response to the read request, the card reader 60 transmits the read-out card information to the terminal device 10, from the NFCP 601 through the Nfc.js 403 (FIG. 16). The read request and the card information are encrypted with the session key 82.

Similarly, in FIG. 15, when a "print out" button on the screen of the terminal device 10 is touched, the terminal device 10 makes a print-out request to the printer 70, from the Printer.js 404 through PRINTP 701. In response to such a print-out request, the printer 70 prints out text data included in the print-out request (FIG. 16). The print-out request is encrypted with the session key 83.

[e] Fifth Embodiment

The fifth embodiment is different from the first embodiment in that the execution environment includes the driver library.

Configurations of Communication System, Terminal Device, and External Device

Figure 17:
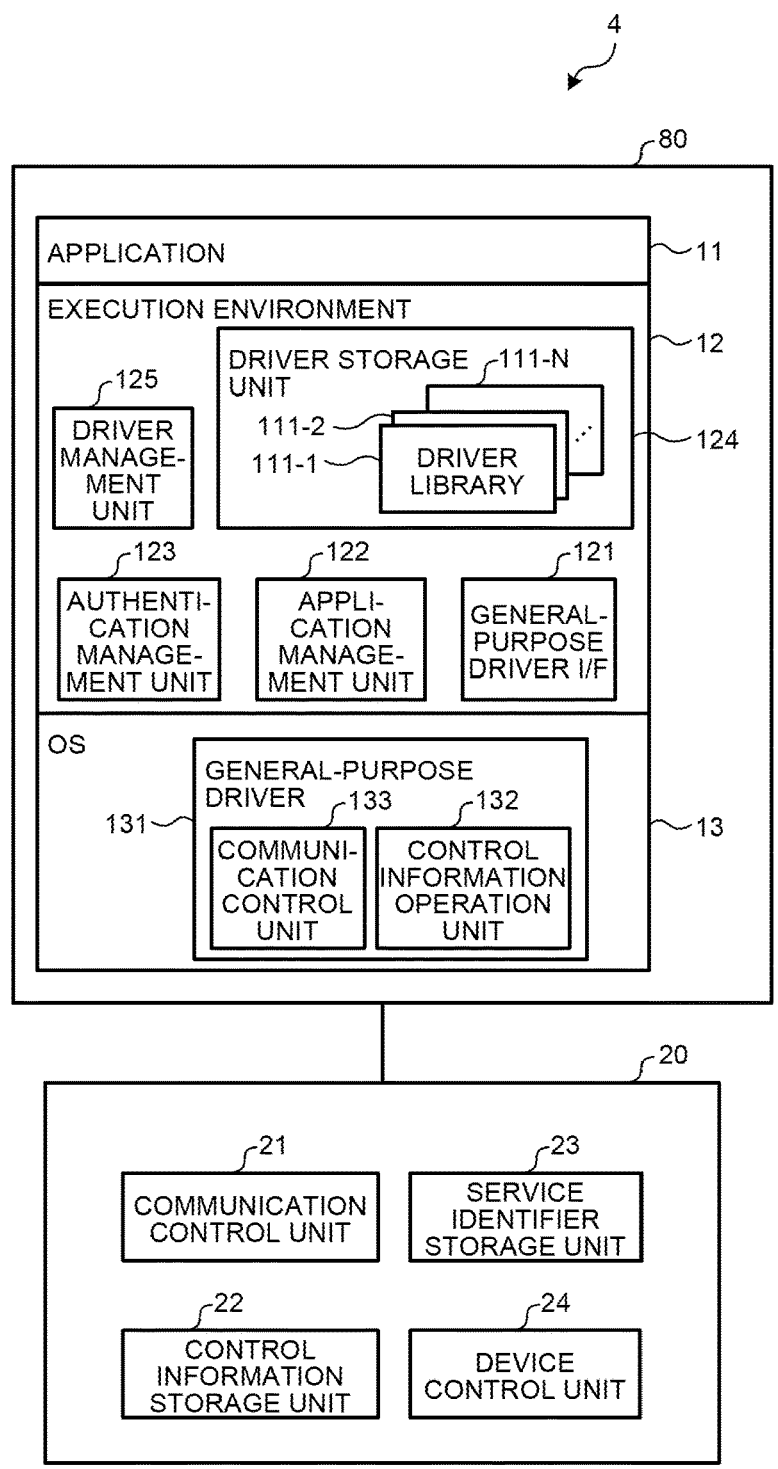
FIG. 17 is a diagram illustrating a configuration example of a communication system according to a fifth embodiment.

FIG. 17 is a diagram illustrating a configuration example of a communication system according to the fifth embodiment. A communication system 4 illustrated in FIG. 17 includes a terminal device 80 and the external device 20. The terminal device 20 is same as in the first embodiment, and thus the explanation thereof is omitted.

The driver library 111 is included in the application 11 in the first embodiment, while the driver library 111 is independent from the application 11 in the fifth embodiment. That is, the execution environment 12 includes a driver storage unit 124 storing the driver library 111 and a driver management unit 125 managing the driver library 111 stored in the driver storage unit 124.

In the fifth embodiment, the application 11 and the driver library 111 are installed separately, and the driver library 111 is not included in the application 11 but stored in the driver storage unit 124. The information of the stored driver library 111 (hereinafter, also referred to as "driver information") is registered in the driver management unit 125. When the driver library 111 is uninstalled, the information of the uninstalled driver library 111 is also deleted from the driver management unit 125. The driver management unit 125 manages driver information and manages, using a driver management table stored in the driver management unit 125, whether the external device 20 corresponding to each driver library 111 can be used around the terminal device 80.

Figures 18, 19:
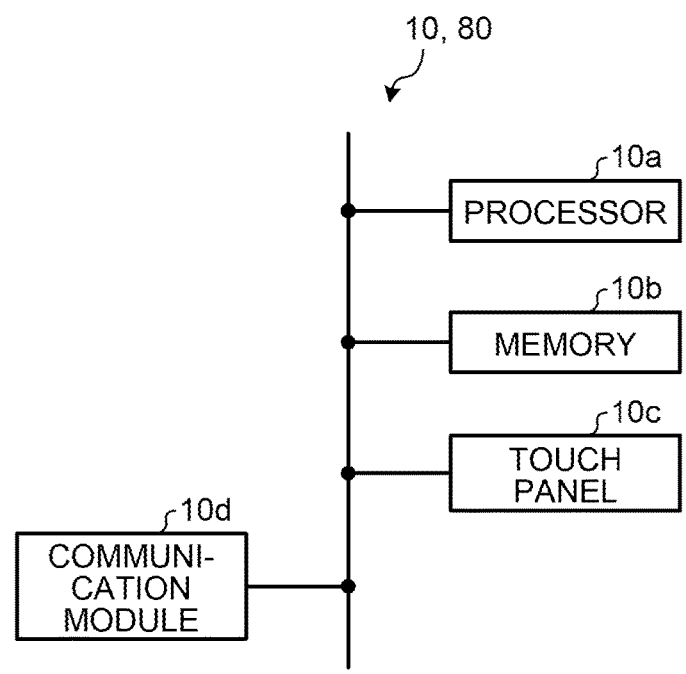
FIG. 18 is a diagram illustrating an example of a driver management table according to the fifth embodiment.
FIG. 19 is a diagram illustrating a hardware configuration example of a terminal device.

FIG. 18 is a diagram illustrating an example of the driver management table according to the fifth embodiment. In the driver management table, a service ID of the external device 20, a driver library name, and a valid flag are associated to one another. The service ID indicates a kind of the external device 20, and a unique service ID is used for each kind of the external devices 20 such as a printer and a card reader. In the example illustrated in FIG. 18, three services (that is, three kinds of external devices) of svid#1, svid#2, and svid#3 are registered in the driver management table. For example, it is possible that a plurality of driver libraries exist for one service, such as the case in which a printer manufactured by a company A and a printer manufactured by a company B, each provide a service "printer". In such a case, in the driver management table, two driver libraries of a driver-1-A and a driver-1-B are associated to the service svid#1 for management.

Moreover, the terminal device 80 moves with the movement of the user, and thus an available external device 20 is generally different depending on a position where the terminal device 80 is located currently. Thus, the valid flag indicates whether the external device corresponding to each driver library registered in the driver management table is available around the terminal device 80, that is, whether the external device is valid. At given timing or when the terminal device 80 enters a given area, the execution environment 12 scans (searches) external devices around the terminal device 80. When a driver library corresponding to an external device found by scanning has been registered in the drive control table, a check mark is put for the valid flag corresponding to the driver library, thus indicating that the driver library is available.

When the application 11 has made a request to the driver library 111, the execution environment 12 refers to the driver management table in accordance with the request, and selects an available driver library 111. The execution environment 12 transmits the request from the application 11 to the selected driver library 111.

When the terminal device 80 has the configuration described above, the application 11 and the driver library 111 can be installed in the terminal device 80 at different timing. Moreover, the execution environment 12 automatically selects the driver library 111 corresponding to the external device 20 available around the terminal device 80. Thus, the application 11 can perform operation without considering which external device 20 is available at a position where the terminal device 80 is located currently.

In the above, the first embodiment to the fifth embodiment have been described.

[f] Other Embodiments

[1] The terminal devices 10, 80 can be implemented with the following hardware configuration, for example. FIG. 19 is a diagram illustrating a hardware configuration example of the terminal device. As illustrated in FIG. 19, the terminal devices 10, 80 includes, as hardware configuration components, a processor 10a, a memory 10b, a touch panel 10c, and a communication module 10d. The processor 10a is exemplified by a central processing unit (CPU), a digital signal processor (DSP), and a field programmable gate array (FPGA), for example. Moreover, the terminal device 10 may be provided with a large scale integrated circuit (LSI) including the processor 10a and peripheral circuits. The memory 10b is exemplified by a random access memory (RAM) such as a synchronous dynamic random access memory (SDRAM), a read only memory (ROM), and a flash memory, for example.

Then, each processing of the terminal devices 10, 80 in the above description may be implemented by causing the processor 10a to execute a program corresponding to each processing. For example, programs corresponding to respective processing in the above description may be stored in the memory 10b, and the processor 10a may read out the programs from the memory 10b to execute them.

Figure 20:
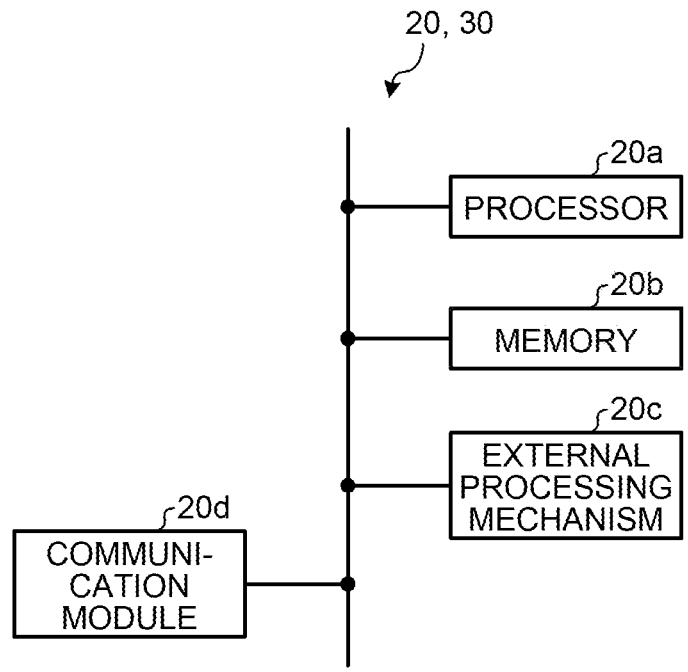
FIG. 20 is a diagram illustrating a hardware configuration example of an external peripheral device.

[2] The external devices 20, 30 can be implemented with the following hardware configuration, for example. FIG. 20 is a diagram illustrating a hardware configuration example of the external device. As illustrated in FIG. 20, the external device 20, 30 include, as hardware configuration components, a processor 20a, a memory 20b, an external processing mechanism 20c, and a communication module 20d. The processor 20a is exemplified by a CPU, a DSP, and an FPGA, for example. Moreover, the external devices 20, 30 may be provided with an LSI including the processor 20a and peripheral circuits. The memory 20b is exemplified by a RAM such as an SDRAM, a ROM, and a flash memory, for example.

Then, each processing of the external devices 20, 30 in the above description may be implemented by causing the processor 20a to execute a program corresponding to each processing. For example, programs corresponding to respective processing in the above description may be stored in the memory 20b, and the processor 20a may read out the programs from the memory 20b to execute them.

Figure 21:
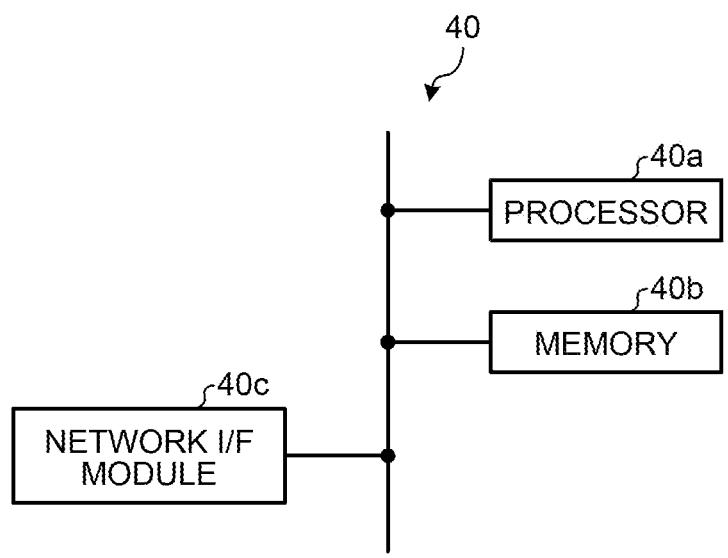
FIG. 21 is a diagram illustrating a hardware configuration example of a server device.

[3] The server device 40 can be implemented with the following hardware configuration, for example. FIG. 21 is a diagram illustrating a hardware configuration example of the server device. As illustrated in FIG. 21, the server device 40 includes, as hardware configuration components, a processor 40a, a memory 40b, and a network I/F module 40c. The processor 40a is exemplified by a CPU, a DSP, and an FPGA, for example. Moreover, the server device 40 may be provided with an LSI including the processor 40a and peripheral circuits. The memory 40b is exemplified by a RAM such as an SDRAM, a ROM, and a flash memory, for example.

Then, each processing of the server device 40 in the above description may be implemented by causing the processor 40a to execute a program corresponding to each processing. For example, programs corresponding to respective processing in the above description may be stored in a storage unit such as the memory 40b or an HDD, and the processor 40a may read out the programs from the storage unit to execute them.

According to the disclosed aspect, it is possible to reduce the labor of developing an application enabling control of an external device from a terminal device including therein an OS not allowing a user to have right to incorporate a driver for controlling the external device in the OS.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A terminal device comprising:
   a mobile operating system that does not allow a user to have a right to incorporate a device driver in the mobile operating system;
   a processor; and
   a communication module that communicates with a server device and an external peripheral device, wherein the communication module receives an application package from the server device, the application package including an application, a first device driver and a control application, the first device driver corresponding to the external peripheral device, the processor takes out the control application from the received application package, the communication module transmits the taken-out control application to the external peripheral device, and the taken-out control application received by the external peripheral device is located in an application layer included in the external peripheral device and converts a first control command transmitted from the communication module into a second control command recognizable by a second device driver included in an operating system stored in the external peripheral device.

2. An external peripheral device control method performed by a terminal device that communicates with a server device and an external peripheral device, the external peripheral device control method comprising:

by the terminal device that comprises a mobile operating system that does not allow a user to have a right to incorporate a device driver in the mobile operating system, receiving an application package from the server device, the application package including an application, a first device driver and a control application, the first device driver corresponding to the external peripheral device, by the terminal device, taking out the control application from the received application package, by the terminal device, transmitting the taken-out control application to the external peripheral device, and the taken-out control application received by the external peripheral device is located in an application layer included in the external peripheral device and converts a first control command transmitted from the communication module into a second control command recognizable by a second device driver included in an operating system stored in the external peripheral device.

* * * * *